March 7, 1967         J. S. SENEY         3,308,304
LIGHT-SENSITIVE SWITCH WITH FEEDBACK
Filed Sept. 18, 1963         3 Sheets-Sheet 1
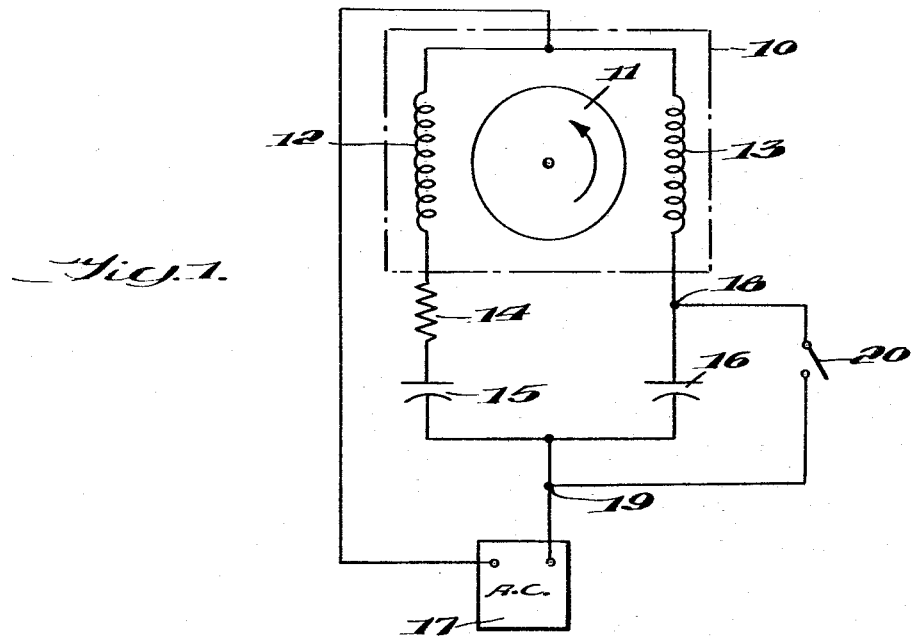
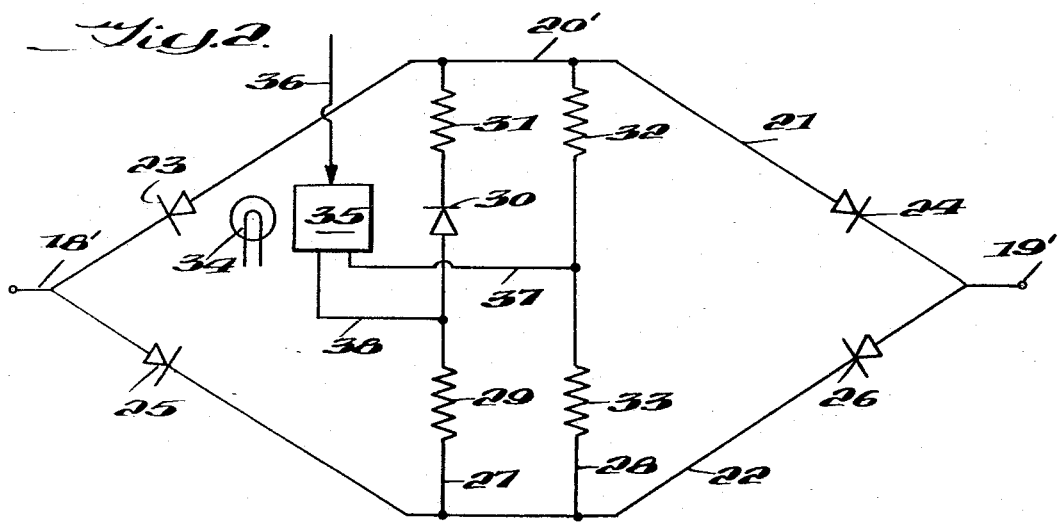

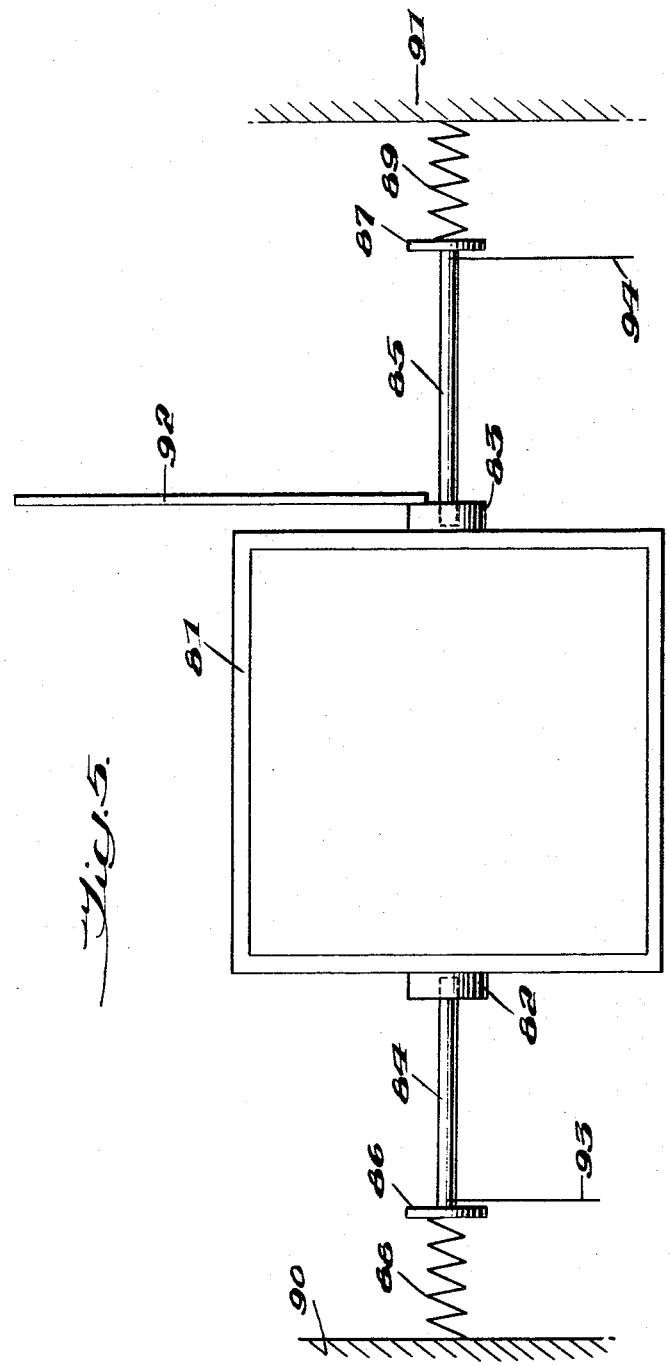

United States Patent Office 3,308,304
Patented Mar. 7, 1967

3,308,304
LIGHT-SENSITIVE SWITCH WITH FEEDBACK
John Seymour Seney, Seaford, Del., assignor to E. I. du Pont de Nemours and Company, Wilmington, Del., a corporation of Delaware
Filed Sept. 18, 1963, Ser. No. 309,767
4 Claims. (Cl. 250—231)

This invention relates generally to servo systems and more particularly to improvements in the circuitry for controlling the action of a servomotor.

Many types of recorder-controller devices have been developed and used in the rapidly increasing field of automation of manufacturing processes. A large number of designs employ a self-balancing potentiometer as the basic element in their design. Devices of this and other types have performed well but their complexity, high initial cost, limited accuracy and high maintenance cost have restricted practical applications. Utility is further restricted by the fact that these devices generally contain complex electronic components such as amplifiers and feedback systems of limited stability and reliability.

The general objective of the present invention is to provide improvements in the servo system circuitry which facilitate use of such systems in a wide variety of process recorders and controllers. A corollary objective is the provision of low cost process control instrumentation in which simplified, reliable components and circuitry may be employed. More specific objectives include the provision of an improved circuit for controlling the speed and rotational direction of servomotors, an improved diode network full wave switch adapted for use in the control circuit and adaptation of these improvements to various automation devices.

These and other objectives are achieved by providing a switch for shorting out a capacitance in one phase connection of a two-phase motor. The preferred switch is a diode bridge having two arms connected in parallel and two legs connected in parallel across the bridge at points intermediate the two diodes in each arm. One leg includes high and low resistances, the other a light sensitive diode. The process control instrumentation is such as to provide either a mechanical or an electrical indication of a variable condition, which variation is employed to expose the light sensitive diode and thereby reverse the direction of motor rotation. Anti-hunt, stabilizing characteristics are incorporated into the recording and/or controlling functions by connecting negative feedback leads from the respective legs of the diode bridge to an electrical component which acts in opposition to the sensed indication.

Additional objectives and advantages will be apparent from the following description wherein reference is made to the accompanying drawings in which:

FIGURE 1 is a diagram of the basic motor control circuit;

FIG. 2 is a wiring diagram for the modified diode network full wave switch;

FIG. 3 is a schematic representation of a servo control system which incorporates the circuit and switch of FIGS. 1 and 2;

FIG. 4 is a schematic representation of a recorder-controller system which also incorporates the circuit and switch of FIGS. 1 and 2; and FIG. 5 is a schematic representation of the taut band meter shown in FIG. 4.

The basic servo system shown in FIG. 1 includes an induction motor 10 having a rotor 11 and two field windings 12, 13. Phase winding 12 has a connection which includes a resistor 14 and a capacitor 15. Phase winding 13 has a connection which includes a capacitor 16. These parallel connections are coupled to a single-phase alternating current source 17. A single-pole, single-throw switch 20 is connected in parallel with capacitor 16 at terminals 18, 19.

In operation, rotor 11 can be made to rotate in either direction or remain stationary by manipulation of switch 20. Phase winding 12 is continuously energized from A.C. source 17 through capacitor 15 and resistor 14 whose values are chosen to shift the electrical voltage phase angle in winding 12 by an amount such as 40° lagging from that supplied by source 17. With switch 20 open, the excitation of winding 13 is also shifted from that of the A.C. source 17, by action of capacitor 16, whose value is chosen such that the electrical phase angle is, for example, 68° lagging. Thus, there is a 28° difference of phase between the two windings. As illustrated, this causes the motor to rotate in a counter-clockwise direction. When switch 20 is closed, shorting out capacitor 16, the electrical phase angle of excitation of winding 13 becomes that of the A.C. source 17 and the phase differential is in the opposite direction from the 28° phase differential existing when the switch 20 was open. Consequently, motor 10 rotates in a clockwise direction. If the switch 20 is switched on and off at a high rate, motor 10 will be rapidly shifted from clockwise to counter clockwise and will cease to rotate or remain stationary if the on/off switching time ratio is one. Similarly, unequal on/off times in rapid operation of the switch can govern the speed and direction of motor rotation.

A preferred alternative to switch 20 is the diode network full wave switch 20' shown in FIG. 2. This network is a bridge which includes a pair of arms 21, 22 connected in parallel. Arm 21 includes a pair of oppositely directed semi-conductor diodes 23, 24 which are conductive in the direction of terminals 18', 19'. Arm 22 includes a pair of oppositely directed semi-conductor diodes 25, 26 which are conductive away from terminals 18', 19'. Two legs 27, 28 are connected across the bridge at points intermediate diodes 23, 24 and 25, 26. Leg 27 includes resistors 29, 31 and a light sensitive PNPN switch diode 30. Leg 28 includes resistors 32, 33. Network 20' functions as a switch responsive to the exposure or nonexposure of diode 30 to light from an associated lamp 34. Transmission of light to diode 30 through a light regulator 35 is responsive to the indication of a variable process condition at 36. As described more fully hereinafter, this indication can be either mechanical or electrical. It affects diode 30 in such a manner as to reverse the rotational direction of motor 10 (FIG. 1).

Figures 3, 4:
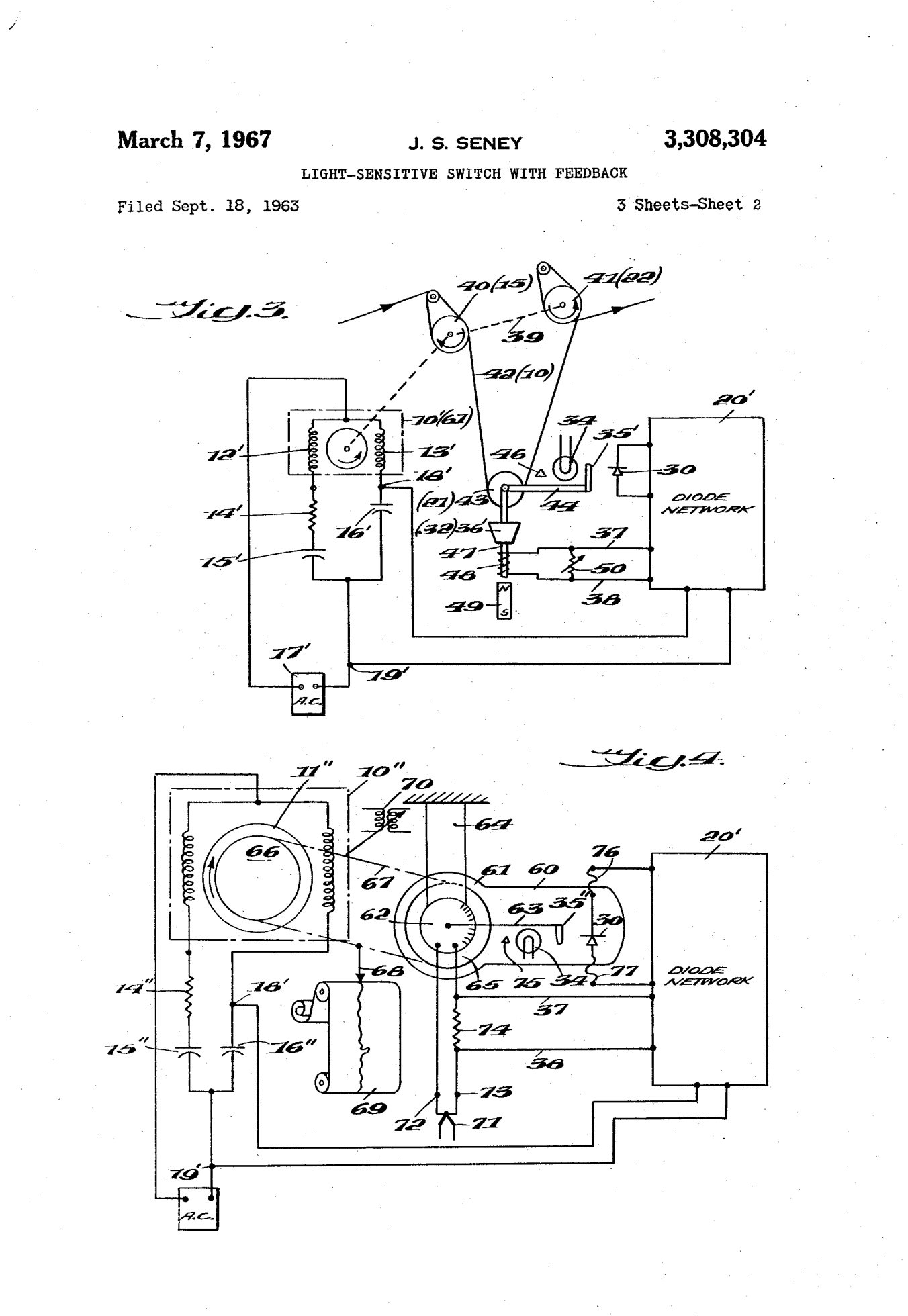

Stabilization or anti-hunt characteristics are incorporated into the servo system by providing leg 28, by proper selection of resistors 29, 31, 32, 33 and by connection of negative feedback lines 37, 38 at points between resistors 29, 31 and 32, 33. Lines 37, 38 are connected to regulator 35 in such a manner as to oppose its normal action responsive to the indication appearing at 36. In an actual embodiment of the system shown in FIG. 4, resistor 29 had a value of 0.06 ohm, 31 was 100 ohms, 32 was 100,000 ohms, 33 was 1.5 ohms and diode 30 was a General Electric No. ZJ2335F light-activated switch diode. This circuit design is such that, when diode 30 is in the conducting state (activated), approximately 2.2 millivolts drop exists across resistor 29 and line 38 is positive with respect to line 37 in electrical potential. When diode 30 is in the blocking state (deenergized), approximately 2.2 millivolts drop exists across resistor 33 but line 38 is negative relative to line 37. Thus, the potential across lines 37, 38 is applied to regulator 35 in the form of a feedback voltage which results in stabilization or anti-hunt characteristics for the system.

In a preferred embodiment, the above servo system has been shown in FIG. 3 as a means for positioning the tension control roller of the denier-measuring device disclosed in U.S. Patent No. 2,744,408. For reference purposes, various designating numerals from that disclosure have been included parenthetically with the numerals used herein in FIG. 3 to designate structure corresponding to apparatus components shown in the patent drawings. The mechanical aspects of this preferred embodiment comprise a two-phase servomotor 10' connected to speed change gears 39 between feed wheels 40, 41. Yarn 42 passes from wheel 40 downwardly around tension control roller 43 and is withdrawn by wheel 41. The amount of tension on the yarn depends on the position and size of a weight 36' suspended from the axis of roll 43. Extending laterally from the axis of roll 43 is an arm 44 carrying at its end a shutter 35'. Located a short distance above arm 44 is a stop 46. Weight 36' has an extension 47 on which is positioned an electromagnetic coil 48. Beneath extension 47, there is a stationary permanent magnet 49. Diode network 20' is the same as that shown in FIG. 2 and accordingly has been shown as a single component except for diode 30. Diode 30 and light source 34 are aligned on opposite sides of shutter 35'. Line 37 is connected to one side and line 38 to the other side of the magnetic feedback coil 48. An attenuating variable resistor 50 is connected across the flexible terminals of coil 48.

In operation, wheels 40, 41 normally rotate at the same speed, the axis of roller 43 is stationary and the tension in yarn 42 remains at a constant level. As noted in connection with switch 20 in FIG. 1, closing of switch circuit 20' shorts out capacitor 16' and thereby reverses the rotational direction of servomotor 10'. This, in turn, varies the relative speed of wheel 41 and consequently the height of roll 43. Motor 10' is so coupled to gears 39 that its normal rotation slows wheel 41, causing roll 43 to drop. When shutter 35' uncovers lamp 34, illuminating diode 30, causing it to conduct, motor 10' is reversed, thus increasing the relative speed of wheel 41 and causing roll 43 to rise. Mechanical stop 46 is arranged to prevent arm 44 and shutter 35' from rising far enough to overshoot and uncover the lamp 34. In other words, diode 30 can only be exposed by downward movement of roll 43 responsive to a decrease in tension on yarn 42. The feedback signal on lines 37, 38 is of such polarity that magnet 49 attracts magnet 47, 48 when diode 30 is conducting and repels it when diode 30 is blocking, thereby exerting a stabilizing or anti-hunting influence on the system.

In FIG. 4, a combination recorder and controller instrument employing a taut band electric meter as the indicator of a condition responsive signal has been shown. The basic elements which are common to the several embodiments are the two-phase induction servomotor 10", including the phase angle-determining reactances 14", 15", 16" and the same modified diode network full wave switch circuit 20' shown in FIGS. 2 and 3. Switch diode 30 is mounted on an extension arm 60 of a disc 61 which is rotatably mounted on an axis coincident with the axis of the taut band movement (FIG. 5) of meter 62. Light source 34 is mounted on arm 60 in line with diode 30. An extension 63 of the meter hand carries a shutter 35" normally positioned between lamp 34 and diode 30. The meter case is fixed to a bracket 64 so that it cannot move. Two pulleys 65, 66 are provided, the first being fixed to disc 61 for rotation thereof and the second being geared to the rotor 11". Pulleys 65, 66 are mechanically linked by an inelastic belt 67. A pen 68 fixed to belt 67 and a movable chart 69 function as a recorder of meter movements. A pick-up device 70, shown as a variable core transformer, is also linked to belt 67 and provides regulation from servomotor 10" to control a process input, e.g., heat.

A temperature indication in the form of an electrical signal is generated by a thermocouple 71 and introduced at 72, 73 as the input to meter 62. Anti-hunt properties are again provided through the introduction of a feedback signal over lines 37, 38 by means of a resistor 74 in one of the meter leads. Finally, a stop 75 is provided to prevent excessive swing of extension 63. Diode switch 30 is electrically connected in the circuit by means of flexible leads 76, 77.

As indicated above, a D.C. microvoltage impulse from thermocouple 71 appears at 72, 73 and is reduced in level by the feedback signal lines 37, 38. The resultant signal moves the meter hand to a corresponding position. When shutter 35" is blocking diode 30, motor 10" imparts clockwise rotation to pulleys 65, 66 and arm 60. This has the effect of lessening the process input at 70, moving pen 68 to the left on chart 69 and exposing diode 30. While diode 30 is conducting, motor rotation is reversed, the process input at 70 is increased, pen 68 moves to the right and the feedback signal on lines 37, 38 is reversed temporarily, causing some slight downward movement of extension 63 and shutter 35". Since the heat input is reduced, extension 63 has a simultaneous tendency toward counterclockwise rotation and diode 30 is masked nearly instantaneously. The movements thus far described are damped substantially by the feedback signal on lines 37, 38.

With an actual decrease in the signal level from thermocouple 71, the meter hand and shutter 35" are moved counterclockwise and diode 30 is exposed. This meter movement is damped somewhat by the reverse polarity of lines 37, 38 relative to terminals 72, 73. The ensuing counterclockwise rotation of pulley 65 and arm 60 increases the process input at 70 and eventually masks diode 30. This sequence may repeat itself several times before the process condition is affected sufficiently to increase the signal level at 72, 73 and move the meter hand clockwise. Stop 75 prevents shutter 35" from unmasking diode 30 in this downward swing. The latter movement of shutter 35" is followed by clockwise movement of arm 60 responsive to the normal rotation of motor 10" in a clockwise direction.

A typical taut band suspension for an electric meter is illustrated in FIG. 5. The meter movement comprises a moving coil assembly 81 having two bosses 82, 83 on the coil frame axially aligned with the axis of rotation of the coil. One end of each of two metal bands 84, 85 is fixed to one of bosses 82, 83. The opposite end of each band is fastened by one of the electrical insulating blocks 86, 87 to the corresponding heavy spring 88 or 89. The latter are fixed to parts 90, 91 of the meter frame. Meter hand 92 is fixed to one boss such as 83. Springs 88, 89 are adjusted to exert sufficient tension on bands 84, 85 to fully support coil assembly 81 and are selected to have sufficient torsional stiffness that coil rotation is accomplished solely by torsional strain in the taut bands. Electric contact to coil 81 is made by leads 93, 94 through the bands. The bands are made of noble metal specially alloyed for high tensile strength and zero set and creep in the elastic stress-strain range used. Thus the taut band suspension has no friction and no mechanical hysteresis. As a consequence, meter calibration does not shift and its sensitivity and ruggedness can be made very high when compared to meters with typical jewel-pivoted movements.

This invention has been described in terms of the basic circuitry and also in connection with practical process instrumentations. Since other embodiments and adaptations will be apparent to one skilled in the art, the invention is intended to be limited only by the scope of the appended claims.

Having thus described the invention, what is claimed as new and desired to be secured by Letters Patent is:

1. A diode network switch comprising: a bridge having two arms connected in parallel, each arm including a pair of oppositely directed diodes; two legs connected in parallel across said bridge at points intermediate the diodes in each arm, one leg including high and low resistances, the other leg including a fifth diode between high and low resistances, said fifth diode being light sensitive; and a pair of negative feedback leads, each lead being connected to a leg between its high and low resistances.

2. In a control circuit, a switch comprising: a bridge having two arms connected in parallel, each including a pair of diodes conductive in opposite directions; two legs connected in parallel across said bridge at points intermediate the diodes in each arm, one leg including high and low resistances, the other leg including a fifth diode between high and low resistances, said fifth diode being light sensitive; a pair of negative feedback leads, each connected to a leg between its high and low resistances; a light source adjacent said fifth diode; a movable light regulator positioned between said source and said fifth diode; and condition responsive means coupled to said regulator for its actuation, said means including an electrical component influencing regulator actuation, said feedback leads being connected to and providing an input to said component.

3. The control circuit of claim 2 wherein said condition responsive means is a movable, weighted element, said regulator is a shutter attached to said element for movement therewith and said component is a magnet assembly acting in opposition to said movement.

4. The control circuit of claim 2 wherein said condition responsive means is an electric meter having a signal responsive hand, said regulator is a shutter coupled to said hand for movement therewith and said component is a resistance in one of the meter leads.

References Cited by the Examiner
UNITED STATES PATENTS

| | | | |
|---|---|---|---|
| 1,905,251 | 4/1933 | Styer | 250—229 |
| 2,649,834 | 8/1953 | Sweet | 250—205 |
| 2,777,069 | 1/1957 | Saeman | 318—448 |

FOREIGN PATENTS 698,277   11/1940   Germany.

RALPH G. NILSON, *Primary Examiner.*

M. ABRAMSON, *Assistant Examiner.*